US008997693B2

(12) United States Patent
Lienemann

(10) Patent No.: US 8,997,693 B2
(45) Date of Patent: Apr. 7, 2015

(54) FEEDER FOR LIVESTOCK

(76) Inventor: Trevor Lienemann, Princeton, NE (US)

( * ) Notice: Subject to any disclaimer, the term of this patent is extended or adjusted under 35 U.S.C. 154(b) by 0 days.

(21) Appl. No.: 13/541,943

(22) Filed: Jul. 5, 2012

(65) Prior Publication Data
US 2013/0000560 A1 Jan. 3, 2013

Related U.S. Application Data

(63) Continuation of application No. 12/631,075, filed on Dec. 4, 2009, now abandoned, and a continuation of application No. 12/198,523, filed on Aug. 26, 2008, now Pat. No. 7,856,943.

(51) Int. Cl.
*A01K 5/00* (2006.01)
*A01K 5/01* (2006.01)

(52) U.S. Cl.
CPC ........................................ *A01K 5/01* (2013.01)

(58) Field of Classification Search
USPC ................. 119/58, 59, 60, 61.1, 63; 414/24.5
See application file for complete search history.

(56) References Cited

U.S. PATENT DOCUMENTS

| 375,824 | A | * | 1/1888 | Light | 119/60 |
| 387,892 | A | * | 8/1888 | Light | 119/60 |
| 3,777,713 | A | * | 12/1973 | Deats | 119/60 |
| 4,957,067 | A | * | 9/1990 | Akins | 119/60 |
| 5,386,800 | A | * | 2/1995 | Pirok | 119/58 |
| 6,045,314 | A | * | 4/2000 | Greene | 414/24.5 |

* cited by examiner

*Primary Examiner* — Brian M O'Hara
(74) *Attorney, Agent, or Firm* — Tyson B. Benson; Advent, LLP

(57) ABSTRACT

A feeder for livestock is disclosed and includes a sidewall having a top portion and a bottom portion, at least a portion of the sidewall forming a feed-receiving enclosure. A plurality of spaced-apart first bars is provided, each first bar extending inwardly from the top portion of the sidewall and are spaced sufficiently apart to allow an animal to place its head therebetween during feeding. An upper portion includes a top member and an intermediate member having a substantially smaller perimeter than a perimeter of the top portion of the sidewall. At least some of the first bars extend between the sidewall and the upper portion. A plurality of spaced-apart second bars are also provided, each the second bar extending between the intermediate member and the top member spaced close enough to prevent feeding from the top portion.

12 Claims, 7 Drawing Sheets

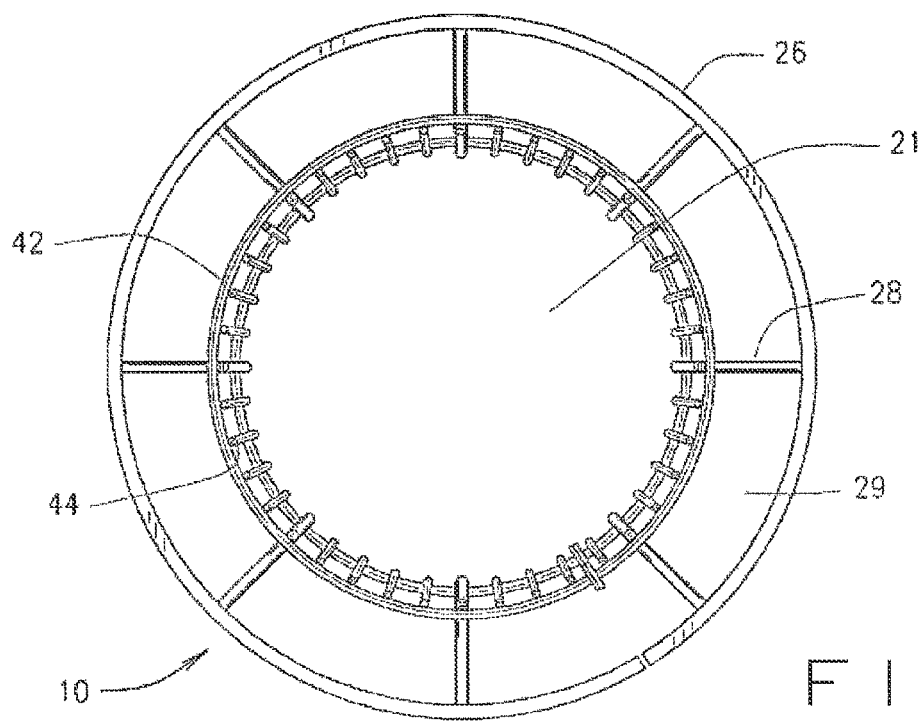

FEEDER FOR LIVESTOCK

CROSS REFERENCE TO RELATED APPLICATION

This application is a continuation in part of U.S. application Ser. No. 12/198,523 filed on Aug. 26, 2008, titled FEEDER FOR LIVESTOCK which is incorporated by reference herein in its entirety.

BACKGROUND OF THE INVENTION

1. Field

The present application relates generally to a livestock feeding device, and more particularly, to a livestock feeder for retaining feed material so that livestock, such as, for example, horses, cattle, sheep, and the like, can consume the feed material while being restrained from wasting the feed material.

2. Description of Related Art

Previously, feed materials may have been placed on the ground in a pile for animals such as horses, cattle, sheep, and the like to feed on. However, a relatively large quantity of the feed material could be wasted by spoilage or trampling by the animals. Conventional feeders have been used to feed round roll-type hay bales and other feed material to livestock in an effort to reduce feed waste. Some conventional feeders may include a circular metal frame having a plurality of horizontally spaced-apart bars positioned thereon which enable the animals to insert their heads therethrough to gain access to the feed material but which are spaced closely enough to prevent the animal from entering the interior of the feeder.

Feeders are typically designed to provide animals with accessibility to the feed material and to minimize feed loss from waste and spoilage. However, even with the use of some conventional feeders, a major cause of feed loss is the removal of feed material from the feeder by the feeding animals where the feed material may then be trampled by the animals or otherwise wasted. This may occur when the animal removes feed material from the feed source and allows loose feed material to fall to the ground.

While conventional feeders have been used in efforts to minimize feed waste, there are a number of problems that can be associated with the conventional feeders designed to be used with livestock. These problems include allowing the animals the ability to waste portions of the feed material by dropping these portions directly on the ground while feeding. Another problem is that some feeders allow the animals to access the feed material at almost any point along the height of the feeder. When animals are given such access to the feed material, the material may be pushed to one side or the other and allow for a portion of the feed to be pushed out of the feeder and onto the ground. Yet another problem with conventional feeders is that the animals, which would naturally graze on ground vegetation, may access the feed at elevated positions along a side of a feeder. This results in an unnatural feeding posture for the animal that may result in injury.

This problem has to some extent been reduced by the manufacture of feeders which basically comprise a cylindrical frame within which the feed material is placed, the frame including a number of upright bars which prevent the animal from entering the frame while allowing the animal to place its head through the bars to grasp the feed material for eating. However, there remain significant losses with a device of this type. The animal tends to place its head into the frame arrangement to grasp the feed and then tends to remove its head from the frame to eat the feed and in some cases drops feed material onto the ground around its feet which becomes trampled and wasted. Significant quantities of dropped feed can thus be lost to spoilage and rot from ground contact. Also, due to the large vertical openings, or lack of shielding at the bottom of conventional feeders, certain amounts of feed material are sorted through and pushed out of the sides of the feeder.

The prior art includes various feeders addressing some or all of the aforementioned design considerations. For example the Payne U.S. Pat. No. 5,522,345 discloses a livestock feeder with upright leg members interconnected by horizontal retainer members forming annular rings defining an enclosure for feed material.

In order to further eliminate hay waste, Delichte (U.S. Pat. No. 4,706,609) teaches a rigid hay bale feeder having an inner frame within which the cylindrical bale is confined, and an outer frame separated a fixed distance from the inner frame to prevent or to limit access to the hay bale by the animals. Some waste is eliminated because much of the hay that drops from the animal's mouth as it tears at the hay bale is dropped back into the feeder for later feeding instead of falling to the ground to be trampled and wasted. Delichte, however, suffers from a number of disadvantages due to its rigid design and structural form. When animals pull a portion of the bale out of the inner frame, they should place their heads between the upright bars of the outer frame. The animals are more likely to bump their heads against the outer frame. Conventional feeders may also allow access to the upper portions of the feed material. As animals eat from the upper portion, the bottom feeding area may become full rather quickly, and overflow resulting in further feed waste.

Some feeders have been designed to hold a portion of the feed material aloft and out of reach of the animals. Such feeders force the animals to reach horizontally or even upwardly to access the feed material. Unfortunately, it is possible in such feeders for the animal to feed on a lower portion of the feed material and undermine the feed material held aloft. In some cases, the lofted feed material may shift downward and onto the animal's head causing injury or trapping the animal and potentially leading to death of the animal.

It is evident from the above discussion that an ongoing need exists for an improved feeder for livestock.

Further objectives and advantages of the present invention will become apparent from a careful reading of a detailed description provided hereinbelow, with appropriate reference to accompanying drawings.

BRIEF SUMMARY OF THE INVENTION

The present invention solves the above and other problems, thereby advancing the state of the useful arts, by providing structures for preventing waste and spoilage of feed. It is an aspect of some embodiments to provide a feeder for livestock comprising a lower portion and an upper portion. The lower portion includes a sidewall having a top portion and a bottom portion and a plurality of spaced-apart first bars. At least a portion of the sidewall forms a feed-receiving enclosure and feeding area. The upper portion includes a top member, an intermediate member and a plurality of spaced-apart second bars.

Each of the first bars extends inwardly and upwardly from the top portion of the sidewall and then upwardly and outwardly. The first bars are spaced sufficiently apart to allow an animal to place its head therebetween during feeding between the lower portion and the upper portion. The intermediate member has a substantially smaller perimeter than a perimeter of the top portion of said sidewall. At least some of said first bars connect the sidewall and the intermediate member and/or upper portion. Each of said second bars connects the intermediate member and the top member and is spaced close enough to limit or prevent feeding from the upper portion. The intermediate member has a substantially smaller diameter than the top member. Each said first bar extends upwardly and inwardly from the top portion of the sidewall to the intermediate member. The top member comprises a plurality of members collectively forming the top member.

BRIEF DESCRIPTION OF SEVERAL VIEWS OF THE DRAWINGS

The above and/or other aspects and advantages of the present invention will become apparent and more readily appreciated from the following detailed description, taken in conjunction with the accompanying drawings of which:

FIG. 3 is a top view of a feeder in accordance with one embodiment of the present invention.

DETAILED DESCRIPTION OF THE INVENTION

Figure 1:
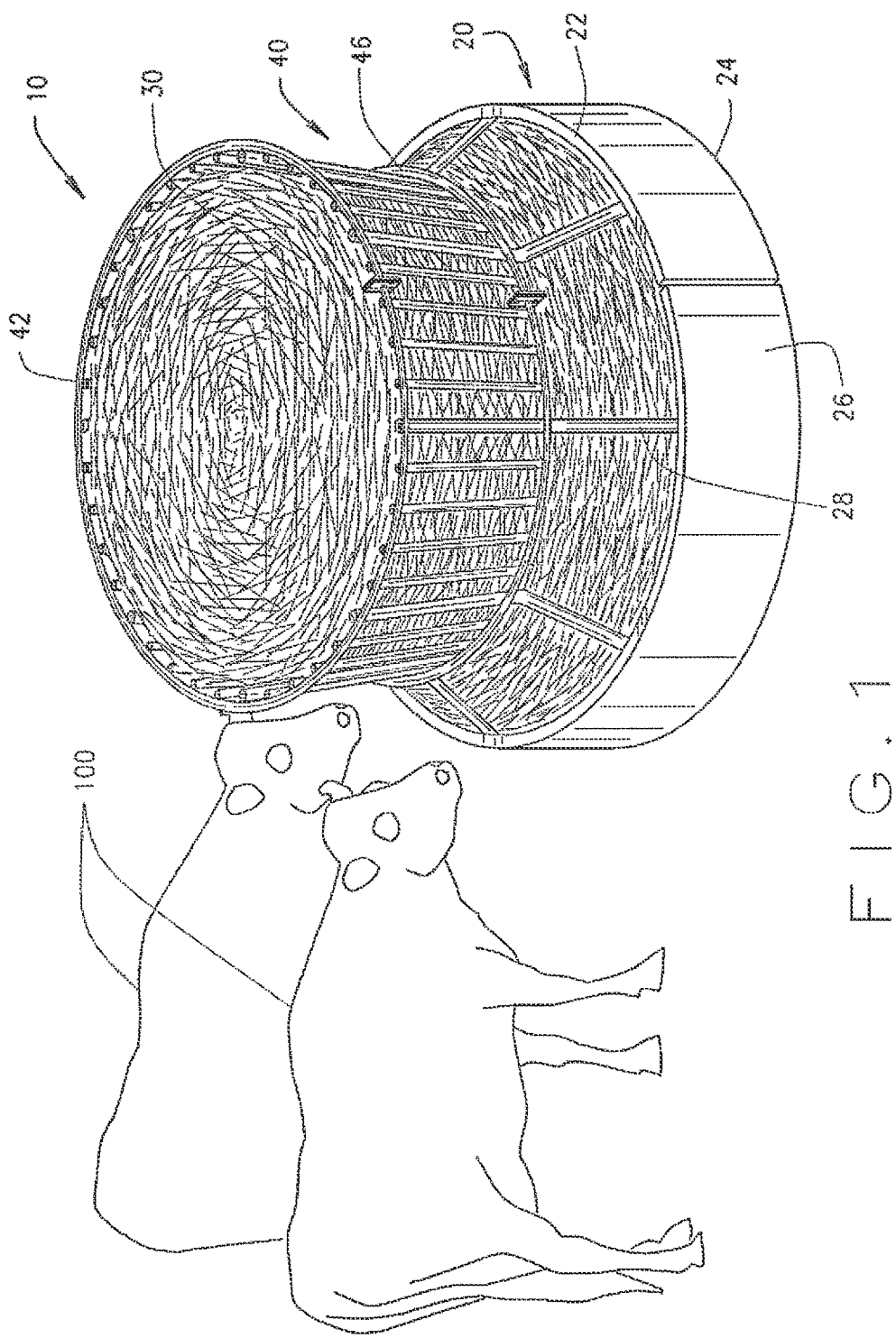
FIG 1 illustrates a feeder in use with cows in accordance with one embodiment of the present invention.

Reference will now be made in detail to exemplary embodiments of be present invention, examples of which are illustrated in the accompanying drawings, wherein like reference numerals refer to the like elements throughout. The exemplary embodiments are described below in order to explain the present invention by referring to the figures.

FIGS. 1-3 illustrate a feeder 10. The device 10 as shown in the drawings includes a lower portion 20 and an upper portion 40.

Figure 2A:
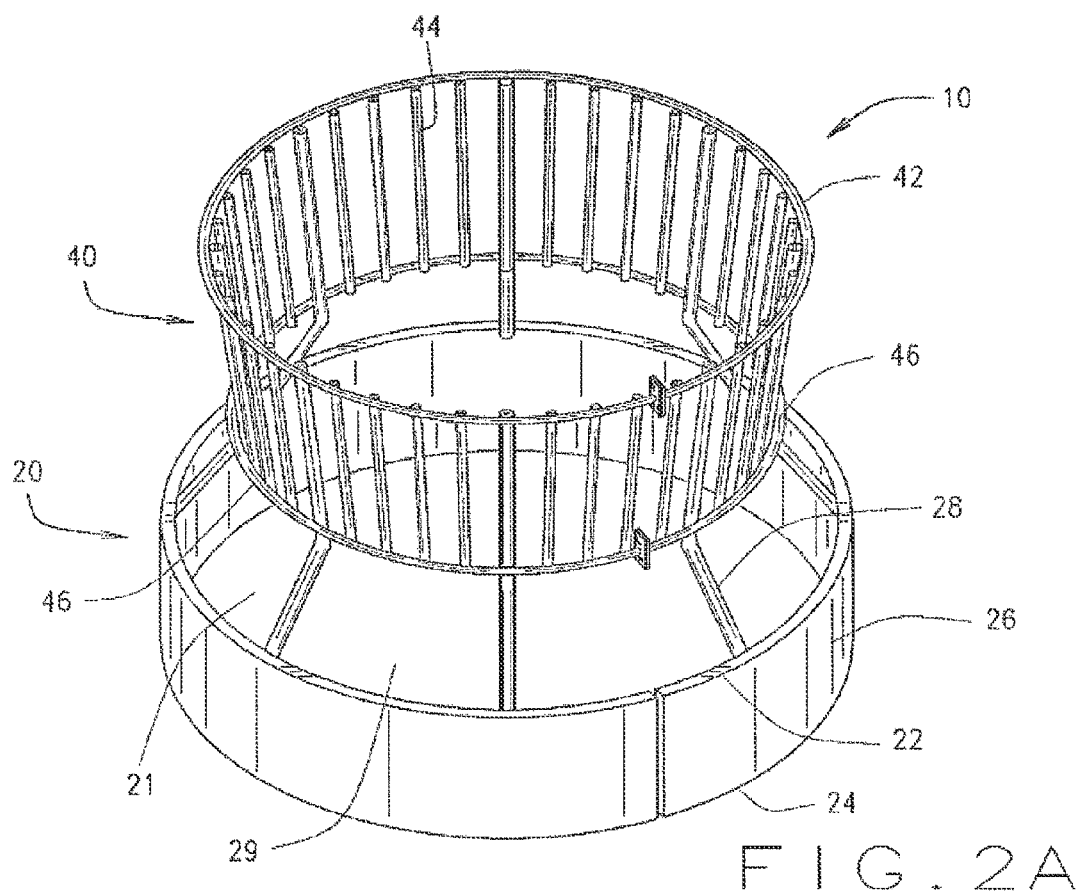
FIG. 2A is a perspective view of a feeder in accordance with one embodiment of the present invention.
Figure 2B:
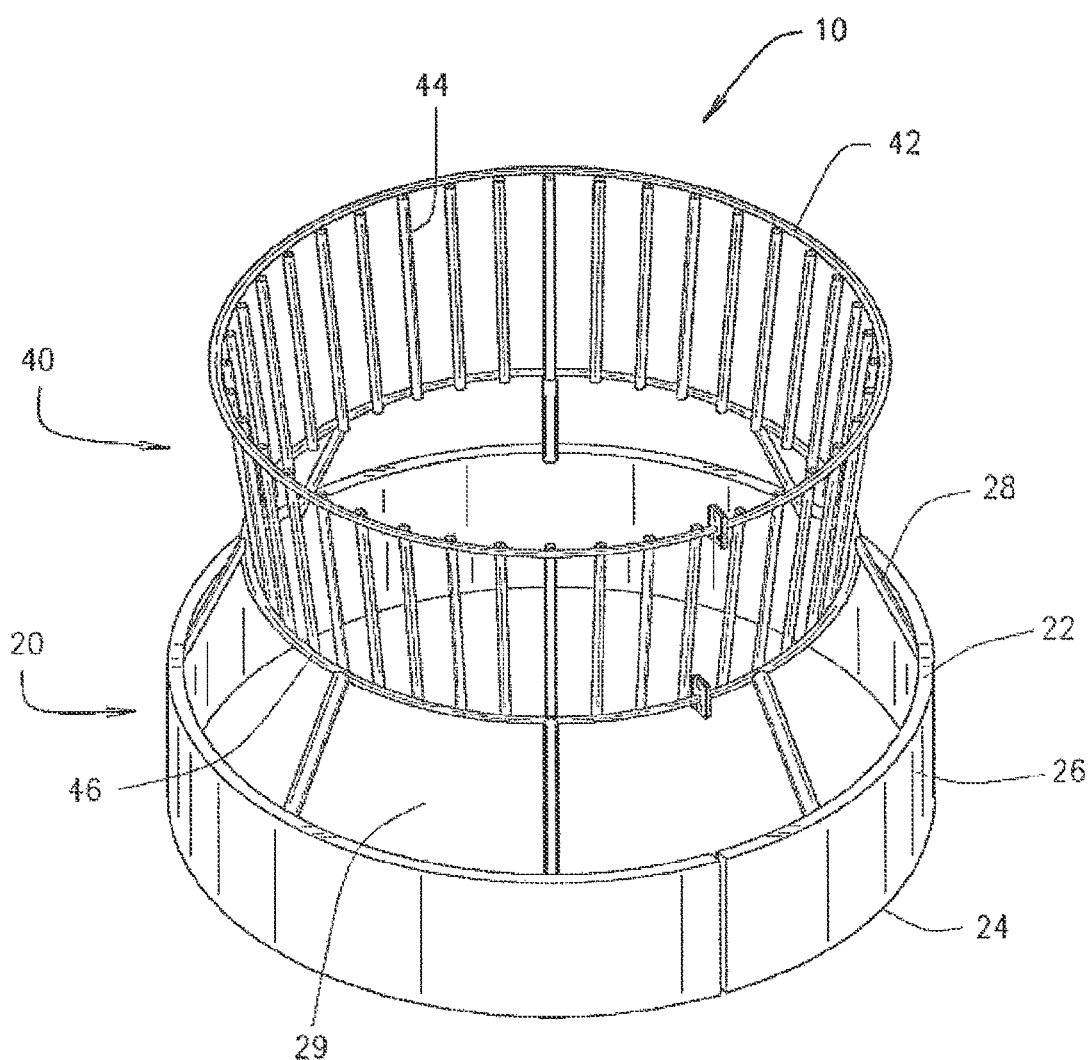
FIG. 2B is a perspective view of a feeder in accordance with another embodiment of the present invention.
Figure 4:
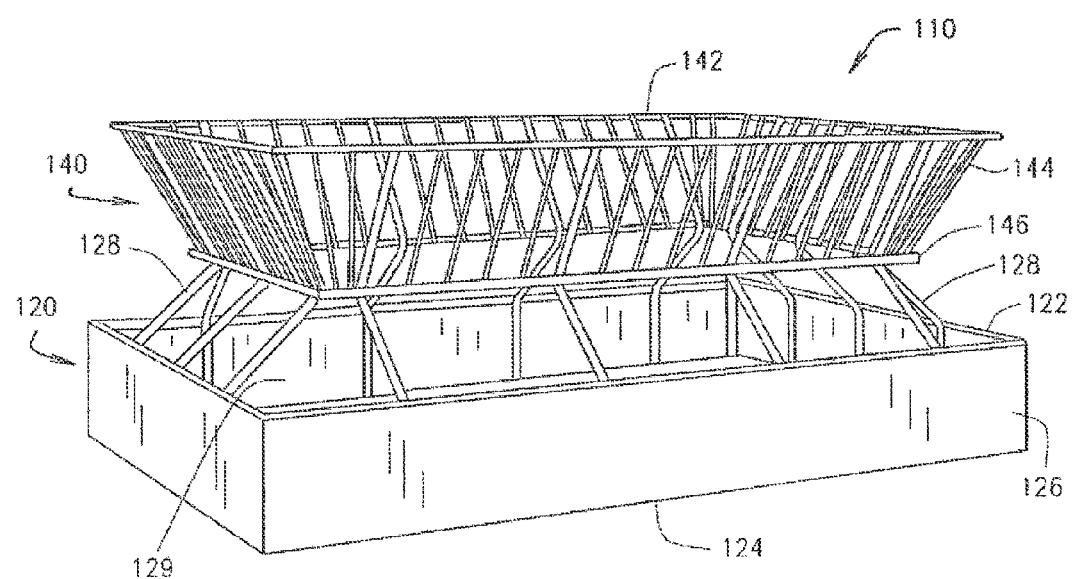
FIG. 4 is a perspective view of a feeder in accordance with another embodiment of the present invention.
Figure 5:
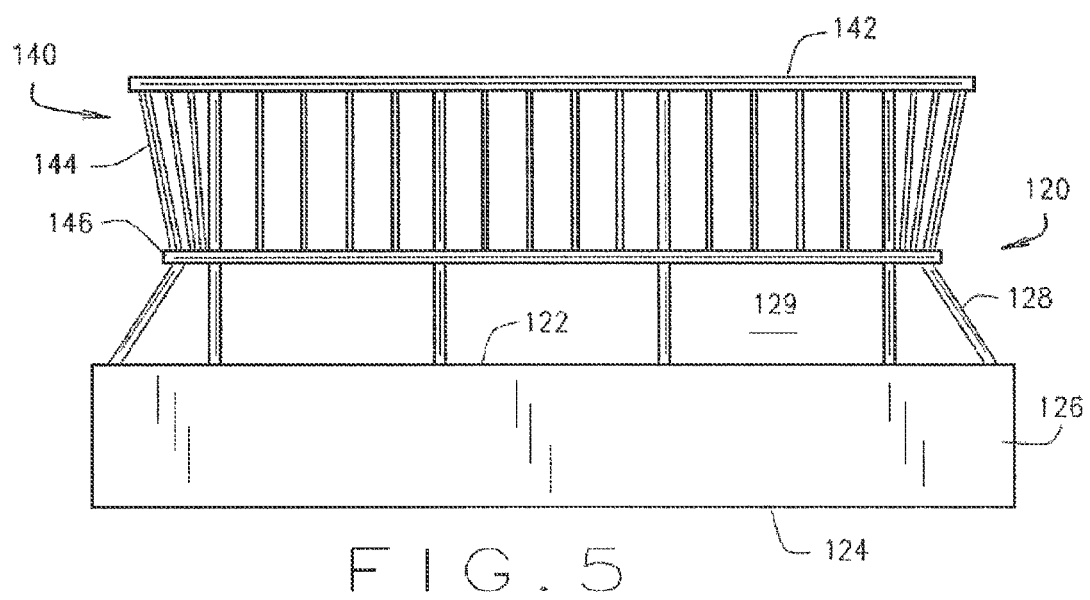
FIG. 5 is a side view of the feeder of FIG. 4
Figure 6:
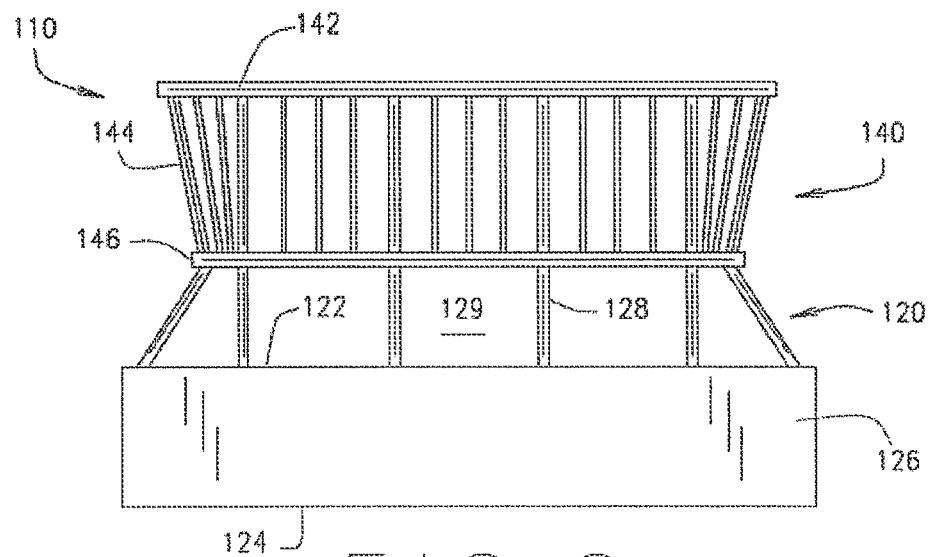
FIG. 6 is another side view of the feeder of FIG. 4.

The lower portion 20 includes a sidewall 26 and a plurality of spaced-apart first bars 28. At least a portion of the sidewall 26 forms a feed-receiving enclosure 21 as illustrated in FIG. 3. The sidewall 26 forms the base of animal feeder 10 and rests upon the ground. The sidewall 26 includes a top portion 22 and a bottom portion 24. In one embodiment, the sidewall 26 is circular in shape so as to form the substantially rigid cylindrical arrangement for surrounding the feed material 30 and retaining it in position while also forming a feeding area and preventing animals from entering the feeder and trampling the feed material. The feed material may comprise hay (i.e. round or rectangular bales of hay, loose hay, straw, silage, or byproducts of other agricultural processes including wet distillers' grains, dried distillers' grains, stover, grain products, or any other suitable animal feed). In some embodiments, a solid wall or shield may be used to surround the upper portion 40 by defining a surface that is approximated by the second bars 44. In such embodiments, more flowable feed materials may be used, such as a mixture of silage and wet distillers' grains or other such animal feed. As will be apparent to one skilled in the relevant art(s), other configurations of the sidewall 26 may be used to enclose the feed material. The dimension of the surface defined by the top portion of the sidewall 26 is substantially greater than that of the bottom outlet of the upper portion 40 so as to provide an annular feeding area and receive any feed material that is dropped or spilled by the animal. The annular feeing area allows the animals to feed in a natural feeding posture. The sidewall 26 prevents the animals from entering the feeder and trampling the feed material. The sidewall 26 also prevents foreign external material from entering the feeder. The loose strands portions of feed material are also prevented from being carried off by the wind blowing against and/or through the feeder 10. The height of the sidewall 26 is chosen relative to the height of the animal such that the animal can comfortably reach over the sidewall 26 without pressing the throat of the animal. In a further embodiment, as illustrated in FIG. 2B, the sidewall 26 may comprise a plurality of composite members to form a single cylinder.

A plurality of spaced-apart bars or pipes 28 are welded to and extend between the op portion 22 of sidewall 26 and an intermediate member 46, and between the intermediate member 46 and the top member 42 in conventional fashion.

Between the top portion 22 of the sidewall 26 and an intermediate member 46 of the upper portion 40 are positioned a plurality of first bars 28. The spacing between each first bar 28 and the next adjacent first bar 28, and between top portion 22 and intermediate member 46 is arranged such that the head and neck of at least one animal can pass between the first bars 28, top portion 22, and intermediate member 46 and therefore the animal can eat the feed therebetween. The plurality of first bars 28 may be spaced equi-angularly around the top portion 22 of the sidewall 26 so as to form a plurality of access openings 9 which allow an animal to place its head therethrough during feeding. Access openings 29 to the feeder are provided by a plurality of spaced-apart first bars 28 angularly disposed between the top portion 22 of the sidewall 26 and the intermediate member 46. Since animals 100 insert their heads downwardly through the openings 29, much of the feed material that drops from the animal's mouth as it tears at the feed material is dropped back into the feeder for later feeding instead of falling outside of sidewall 26 and to the ground to be trampled and wasted. In addition it allows the animals to more readily extricate their head from between the bars without any impediments. It will be appreciated that the device is designed for use with multiple sizes of animals and particularly the feeder may be used by either a mature adult or a young animal while preventing younger animals from entering the feeder and trampling the feed material. The animals may access the feed material in a more natural head down grazing posture, thereby reducing the amount of times the animal disengages the feeder.

In some embodiments, the first bars 28 are upwardly inclined elative to a horizontal line so that the bottom outlet of the upper portion 40 is positioned higher than the top edge of the side wall 26. This facilitates access to the feed material and allows the feed material to be spread out into the inner space of the sidewall 26 after it comes out of the outlet of the upper portion 40.

The upper portion 40 includes a top member 42, an intermediate member 46 and a plurality of spaced-apart second bars 44 so as to define the feed material retaining space.

As illustrated in FIG. 2B, each of the top member 42 and the intermediate member 46 may comprise a plurality of composite members to form the round top member 42 and the intermediate member 46, respectively. The composite members can be joined in conventional fashion. The first bars 28 are connected at their respective ends either with the intermediate member 46 or with some of the second bars 44 by welding or by conventional bolts. Alternatively, a first bar 28 and a second bar 44 can be a single member and bended around the intermediate member 46 as illustrated in FIG. 2A.

In this embodiment, the single bar can be attached to the intermediate member 46. Numerous other joining mechanisms will be readily apparent to those of ordinary skill in the art.

In some embodiments, the intermediate member 46 has a substantially smaller perimeter or diameter, in case of the circular shape, than that of the top portion 22 of the side-wall 26.

The upper portion 40 of the feeder 10 is in the shape generally of an inverted, truncated cone. The upper portion 40 maintains the remaining portion of the feed material in a central position relative to the exterior of the feeder, thereby allowing equal access to the feed material and reducing the amount of feed material that may pass to the exterior of the feeder. The upper portion 40 is also circular in shape and has a funnel shape to accept feed material and directs it downward. In one embodiment, the diameter of the top member 42 is more than the normal diameter of a cylindrical hay bale so that the hay is easily inserted into the upper portion 40 of the feeder 10. The top member 42 may have a larger perimeter than intermediate member 46 to facilitate loading the upper portion 40 with feed material. In other embodiments, the top member 42 and the intermediate member 46 may have approximately equivalent perimeters. The vertical height of the top member 42 is such that access to feeding over the top of feeder 10 is denied to the animals.

The top member 42 is interconnected to the intermediate member 46 by a plurality of the second bars 44. In one embodiment, the second bars 44 can be spaced equi-angularly around the intermediate member 46 and spaced close enough to limit or prevent feeding from the upper portion 40. The positioning of the second bars 44 is arranged accordingly. The second bars 44 serve to support the feed material and to keep the feed material coherent.

The various elements of the animal feeder 10 may be constructed from metal, plastic or wood materials. For most purposes, however, it is preferred to employ metal elements. Bars 28, 44 as well as top member 46 and intermediate member 46 are preferably formed from conventional metal pipe tubing. Sidewall 26 is preferably form d from sheet metal or fiberglass although it may be formed from a rigid plastic material.

Normally, cylindrical hay bales are placed in the interior of the feeder 10. The animal extends its head and neck between the first bars 28, intermediate member 46, and top portion 22 to feed. In the feeding process, much feed material is consumed. Additional feed material is provided from the bottom outlet of the upper portion 40 remains within the enclosure defined by the sidewall 26. As the animals consume feed material from the feeder 10, excess feed material falls within the area between the sidewall 26 and the intermediate member 46 which prevents the feed material (e.g. the hay) so falling from being trampled into the ground. The animals can eat the feed material which has fallen into the area between the sidewall 26 and the intermediate member 46.

FIGS. 4-7 illustrate a feeder 110. The device 110 as shown in the drawings includes a lower portion 120 and an upper portion 140.

Figure 7:
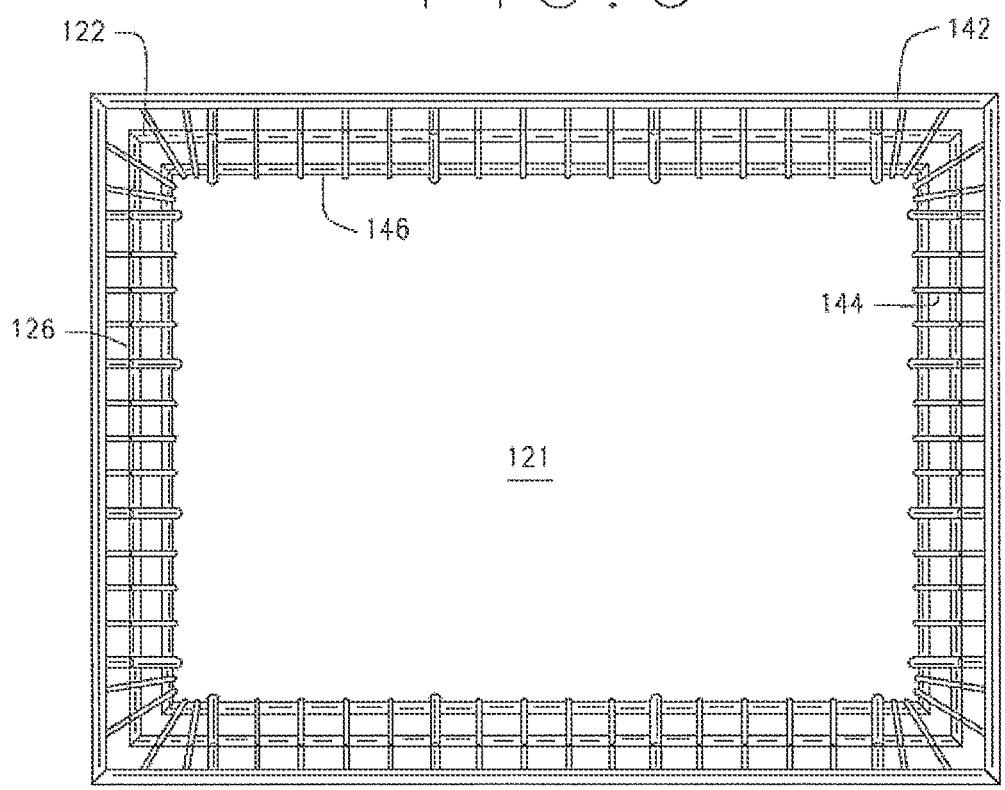
FIG. 7 is a top view of the feeder of FIG. 4.

The lower portion 120 includes a sidewall 126 and a plurality of space-apart first bars 128. At least a portion of the sidewall 126 forms a feed-receiving enclosure 121 as illustrated in FIG. 7. The sidewall 1126 forms the base of animal feeder 110 and rests upon the ground. The sidewall 126 includes a top portion 1122 and a bottom portion 124. In some embodiments, the sidewall 126 is rectangular in shape so as to form the substantially rigid arrangement for surrounding the feed material and retaining it in position while also forming a feeding area and preventing animals from entering the feeder and trampling the feed material. The feed material may comprise hay (i.e. round or rectangular bales of hay, loose hay, straw, silage, or byproducts of other agricultural processes including wet distillers' grains, dried distillers' grains, stover, grain products, or any other suitable animal feed). In some embodiments, a solid wall or shield may be used to surround the upper portion 140 by defining a surface that is approximated by the second bars 144. In such embodiments, more flowable feed materials may be used, such as a mixture of silage and wet distillers' grains or other such animal feed. As will be apparent to one skilled in the relevant art(s), other configurations of the sidewall 126 may be used to enclose the feed material. The dimension of the surface defined by the top portion of the sidewall 126 is substantially greater than that of the bottom outlet of the upper portion 140 so as to provide an annular feeding area and receive any feed material that is dropped or spilled by the animal.

A plurality of spaced-apart bars or pipes 128 are welded to and extend between the top portion 122 of sidewall 126 and an intermediate member 146, and between the intermediate member 146 and the top member 142 in conventional fashion.

Between the top portion 122 of the sidewall 126 and an intermediate member 146 of the upper portion 140 are positioned a plurality of first bars 128. The spacing between each first bar 128 and the next adjacent first bar 128, and between op portion 122 and intermediate member 146 is arranged such that the head and neck of at least one animal can pass between the first bars 128, top portion 122, and intermediate member 146 and therefore the animal can eat the feed therebetween. Since animals may insert their heads downwardly through the openings 129, much of the feed material that drops from the animal's mouth as it tears at the feed material is dropped back into the feeder for later feeding instead of falling outside of sidewall 126 and to the ground to be trampled and wasted. In addition it allows the animals to more readily extricate their head from between the bars without any impediments. It will be appreciated that the device is designed for use with multiple sizes of animals and particularly the feeder may be used by either a mature adult or a young animal while preventing younger animals from entering the feeder arid trampling the feed material. The animals may access the feed material in amore natural head down grazing posture, thereby reducing the amount of times the animal disengages the feeder.

The upper portion 140 includes a top member 142, an intermediate member 146 and a plurality of spaced-apart second bars 144 so as to define the feed material retaining space.

Each of the top member 142 and the intermediate member 146 may comprise a plurality of composite members to form the round top member 142 and the intermediate member 146, respectively. The composite members can be joined in conventional fashion. The first bars 128 are connected at their respective ends either with the intermediate member 416 or with some of the second bars 144 by welding or by conventional bolts. Alternatively, a first bar 128 and a second bar 144 can be a single member and bended around the intermediate member 146. In some embodiments, the single bar can be attached to the intermediate member 146. Numerous other joining mechanisms will be readily apparent to those of ordinary skill in the art.

The upper portion 140 of the feeder 110 is in the shape generally of an inverted, truncated rectangular pyramid. The upper portion 140 maintains the remaining portion of the feed material in a central position relative to the exterior of the feeder, thereby allowing equal access to the feed material and reducing the amount of feed material that may pass to the exterior of the feeder. The upper portion 140 is also rectangular in shape and has a funnel shape to accept feed material and direct it downward. In one embodiment, the perimeter of an area defined by top member 142 is more than the normal diameter of a rectangular hay bale so that the hay is easily inserted into the upper portion 140 of the feeder 110. The top member 142 may have a larger perimeter than intermediate member 146 to facilitate loading the upper portion 140 with feed material. In other embodiments, the top member 142 and the intermediate member 146 may have approximately equivalent perimeters, The vertical height of the top member 142 is such that access to feeding over the top of feeder 110 is denied to the animals.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

For example, in an exemplary embodiment for use in feeding cattle, a bottom portion may have a diameter of about 8.5 ft, the intermediate member may have a diameter of about 6.0 ft, and the top portion may have a diameter of about 8.0 ft. The feeder can be fabricated in various sizes and configurations from a wide variety of suitable materials, which are chosen for their characteristics according to the intended use and the operation of the feeder. For example, a smaller set of dimensions may be used with animals such as sheep.

The terminology used in the description herein is for the purpose of describing particular embodiments only and is not intended to be limiting of the invention. As used in the description of the embodiments and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims.

What is claimed is:

1. A feeder for livestock, the feeder comprising:
    a lower portion including:
        a sidewall having a top portion and a bottom portion, said sidewall forming a feed-receiving enclosure, the bottom portion of the sidewall defining a first opening to receive a bale of hay;
        a plurality of spaced-apart first bars, each said first bar extending upwardly from the top portion of said sidewall and being spaced sufficiently apart to allow an animal to place its head therebetween during feeding; and
    an upper portion including:
        a circular top member defining a second opening to receive the bale of hay;
        a circular intermediate member, the intermediate member having a substantially smaller perimeter than a perimeter of the top portion of said sidewall, the intermediate member having a smaller perimeter than that of a perimeter of said top member, the intermediate member defining an opening large enough to receive the bale of hay; and
        a plurality of spaced-apart second bars, each said second bar extending between said intermediate member and said top member, said second bars spaced close enough to prevent feeding from the top portion wherein there is a greater number of second bars than first bars such that feed may be retained by the second bars and an animal's access to a region interior to the feeder and proximate to the second bars is limited compared to a region interior to the feeder and proximate to the first bars, each said second bar extending upwardly between said intermediate member and said top member;
    wherein said first bars extend between said sidewall and said intermediate member.

2. The feeder of claim 1 wherein said each second bar of the plurality of spaced-apart second bars are disposed equiangularly with respect to said top member.

3. The feeder of claim 1 wherein said intermediate member comprises a plurality of members collectively forming said intermediate member.

4. A feeder for livestock, the feeder comprising:
    a lower portion including:

a sidewall having a top portion and a bottom portion, said sidewall forming a feed-receiving enclosure, the bottom portion of the sidewall defining a first opening to receive a bale of hay;

a plurality of spaced-apart first bars, each said first bar extending upwardly from the top portion of said sidewall and being spaced sufficiently apart to allow an animal to place its head therebetween during feeding; and an upper portion including:

a top member defining a second opening to receive the bale of hay;

an intermediate member, the intermediate member having a substantially smaller perimeter than a perimeter of the top portion of said sidewall, the intermediate member defining an opening large enough to receive the bale of hay; and a plurality of spaced-apart second bars, each said second bar extending between said intermediate member and said top member said second bars spaced close enough to prevent feeding from the top portion, wherein each second bar is disposed equiangularly with respect to said top member, wherein said first bars extend upwardly between said sidewall and said intermediate member, and there are a greater number of second bars than first bars such that feed may be retained by the second bars and an animal's access to a region interior to the feeder and proximate to the second bars is limited compared to a region interior to the feeder and proximate to the first bars.

5. The feeder of claim 4 wherein said intermediate member has a smaller perimeter than that of said top member.

6. The feeder of claim 4 wherein said intermediate member comprises a plurality of members collectively forming said intermediate member.

7. The feeder of claim 4 wherein said sidewall is rectangular in shape.

8. A feeder for livestock, the feeder comprising:

a lower receptacle including:

a sidewall having a top portion and a bottom portion, said sidewall forming a feed-receiving enclosure, the bottom portion of the sidewall defining an opening to receive a bale of hay;

a plurality of spaced-apart first bars, each said first bar extending upwardly from the top portion of said sidewall and being spaced sufficiently apart to allow an animal to place its head therebetween during feeding; and an upper portion including:

a top member defining a second opening to receive the bale of hay;

an intermediate member, the intermediate member having a substantially smaller perimeter than a perimeter of the top portion of said sidewall wherein said first bars extend upwardly between said sidewall and said intermediate member, the intermediate member defining an opening large enough to receive the bale of hay; and a plurality of spaced-apart second bars, each said second bar extending upwardly between said intermediate member and said top member, said second bars spaced close enough to prevent an animal from placing its head therebetween wherein there is a greater number of second bars than first bars such that feed may be retained by the second bars and an animal's access to a region interior to the feeder and proximate to the second bars is limited compared to a region interior to the feeder and proximate to the first bars, wherein each second bar is disposed equiangularly with respect to said top member.

9. The feeder of claim 8 wherein said intermediate member has a smaller perimeter than that of said top member.

10. The feeder of claim 8 wherein each said first bar extends inwardly from the top portion of said sidewall to said intermediate member.

11. The feeder of claim 8 wherein said top member comprises a plurality of members collectively forming said top member.

12. The feeder of claim 8 wherein said intermediate member comprises a plurality of members collectively forming said intermediate member.

* * * * *